United States Patent
Heravi et al.

(10) Patent No.: US 6,864,650 B2
(45) Date of Patent: Mar. 8, 2005

(54) WINCH CONTROLLER

(75) Inventors: Oliver Heravi, Tigard, OR (US); Christopher S. Brune, Tualatin, OR (US); Mitchell R. Lawson, Vancouver, WA (US)

(73) Assignees: Warn Industries, Inc., Milwaukee, OR (US); Sure Power, Inc., Tualatin, OR (US)

( * ) Notice: Subject to any disclaimer, the term of this patent is extended or adjusted under 35 U.S.C. 154(b) by 0 days.

(21) Appl. No.: 10/602,278

(22) Filed: Jun. 24, 2003

(65) Prior Publication Data

US 2004/0263100 A1 Dec. 30, 2004

(51) Int. Cl.$^7$ ................................................ H02P 1/00
(52) U.S. Cl. ........................ 318/280; 318/266; 388/933
(58) Field of Search ................................ 318/280, 266, 318/16, 480, 286, 434; 388/933, 907.5

(56) References Cited

U.S. PATENT DOCUMENTS

| | | |
|---|---|---|
| 5,214,359 A | 5/1993 | Herndon et al. |
| 5,522,582 A | 6/1996 | Dilks |
| 5,648,887 A | 7/1997 | Herndon et al. |
| 6,046,893 A | 4/2000 | Heravi |
| 6,369,530 B2 * | 4/2002 | Kovach et al. ............... 318/16 |

* cited by examiner

*Primary Examiner*—Karen Masih
(74) *Attorney, Agent, or Firm*—Harness, Dickey & Pierce, PLC (57) ABSTRACT

A solid state controller is provided for a winch and includes fault detection for several parameters and overload interrupt controlled by the controller. The system uses a single controller that can be programmed for several different products and utilizes MOSFET switches for alternating the direction of current

13 Claims, 7 Drawing Sheets

WINCH CONTROLLER

FIELD OF THE INVENTION

The present invention relates to a winch, and more particularly to a solid state controller for a winch.

BACKGROUND AND SUMMARY OF THE INVENTION

Winches support a wide range of applications and assume a variety of sizes and types. Winches typically have an upper load limit. Potential damage or actual damage may occur when a winch is driven beyond its load limit; i.e., placed under a load condition exceeding its load limit. In addition, continued use of a winch under heavy load can cause the motor and other components of the winch to heat up. As the temperature of the motor or other components reach a predetermined maximum, the motor and/or circuit components become susceptible to damage, as well.

Accordingly, it is desirable to provide a system that is capable of detecting an overload condition of the winch and interrupting operation of the motor in order to prevent damage due to overload. It is also desirable to provide a fault detection system that monitors operation conditions of the motor and associated circuitry in order to prevent overheating of the components or application of voltages that exceed predetermined levels.

The present invention incorporates a programmable controller for use with a winch. The controller is provided with fault detection and overload interrupt functions. The control unit can be utilized across a variety of different systems. In particular, the controller can be specifically configured to be used with a specific winch type. For example, winches for automotive vehicles are designed to be operated with a 12 volt, a 24 volt or a 42 volt battery and may be provided with or without overload interrupt features, and may provide for motor over temperature warnings or fault conditions being provided. With each of these various functionalities, a single controller design can be specifically configured for use with multiple product lines having different variations of functions.

The winch controller of the present invention provides an electronic replacement of the electromechanical solenoid switches used on conventional winches. The heart of the controller utilizes four high current electronic switches that change the direction of the field current for changing the direction of rotation of the winch motor. The high current electronic switches are operated using low current signals from the controller, and therefore, have low current demand on the battery. Conventional electromechanical solenoid switches are subject to wear and tear due to jostling and vibration as well as corrosion due to environmental conditions including water, dirt, and debris that can cause the components to arc and weld together. Furthermore, the electro-mechanical solenoid switches are bulky.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
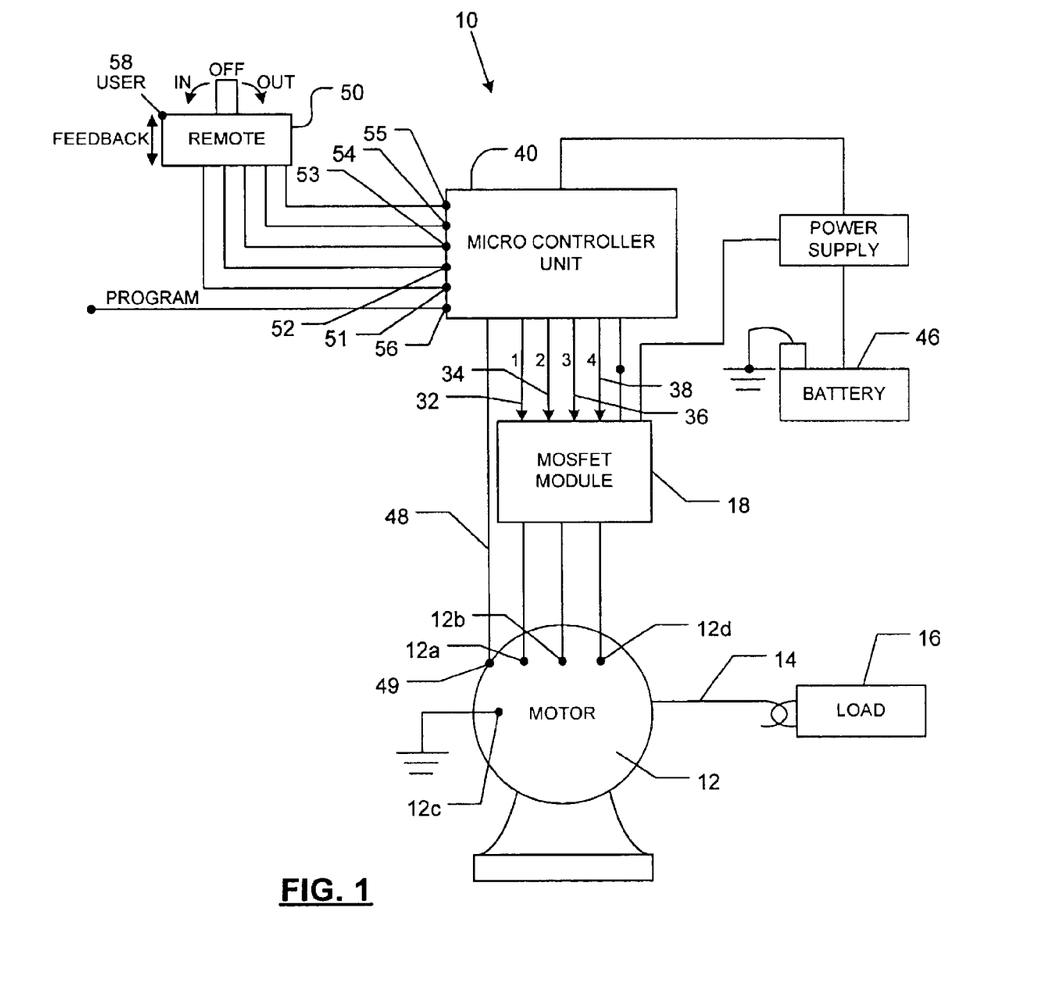
FIG. 1 is a schematic view of a winch system and controller according to the principles of the present invention.

FIG. 1. illustrates a winch system 10 in accordance with a preferred embodiment of the present invention. Winch system 10 includes an electric motor 12 with a spool (not shown) for deploying or collecting a cable 14 attached to a load 16. Control terminals 12a and 12b of motor 12 provide electric current to the field coil of the motor 12 for causing motor 12 to operate in one of two rotational directions. A third terminal 12c of motor 12 ties to ground potential and a fourth terminal 12d is connected to the armature of the motor 12.

Figure 2:
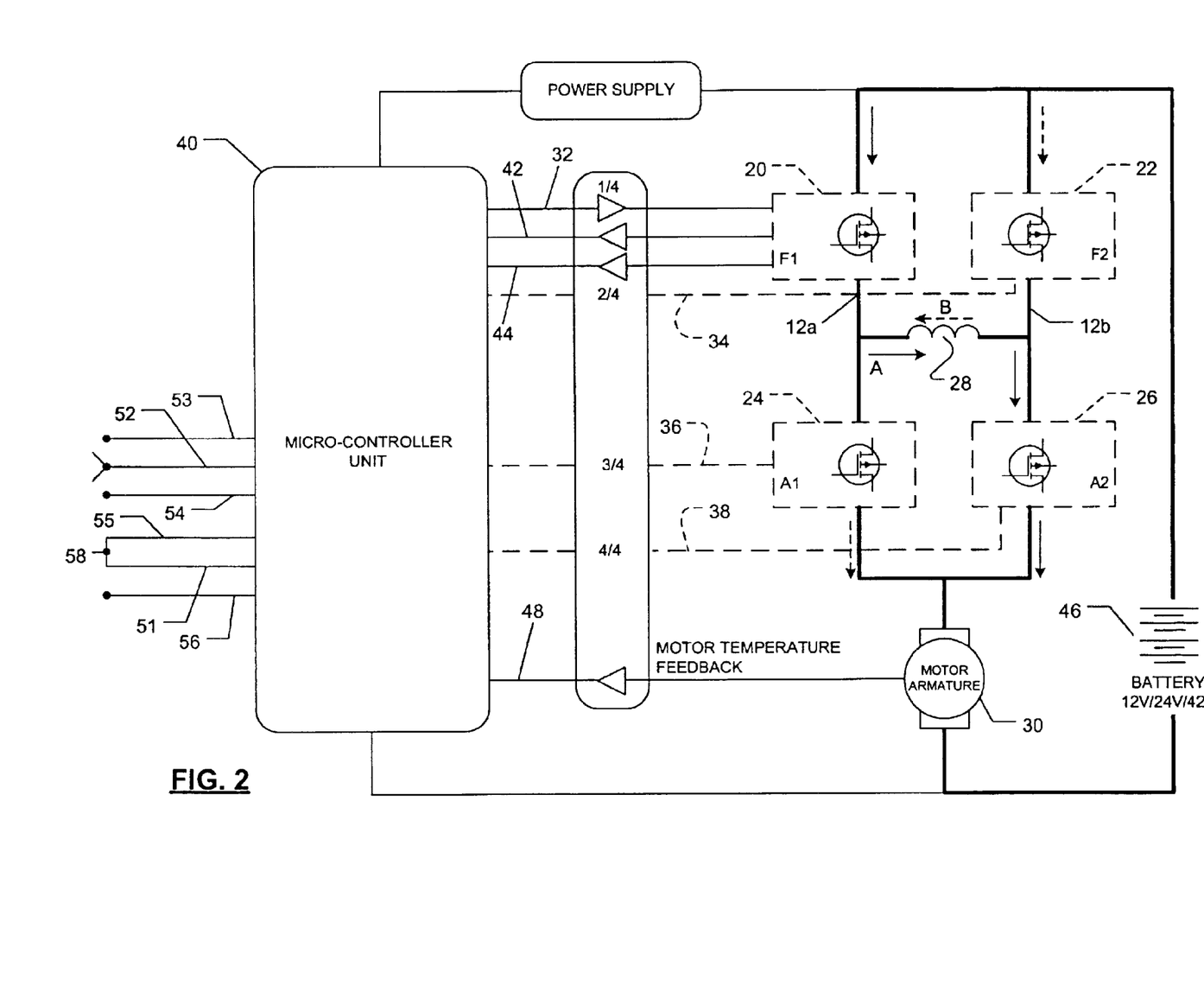
FIG. 2 is a schematic diagram of the winch controller according to the principles of the present invention.
Figure 3:
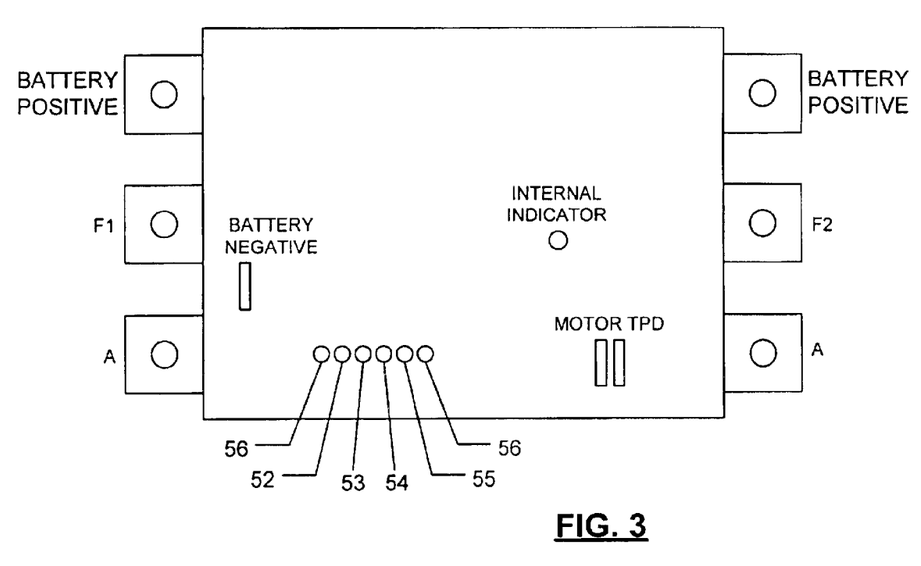
FIG. 3 is a module connection diagram for the winch controller according to the principles of the present invention.

A MOSFET module 18 is provided for controlling the direction of current through the field coil of the motor 12. In particular, the MOSFET module 18 includes four high current electronic switches 20, 22, 24, 26 (best shown in FIG. 2) based on silicon MOSFET technology. The. MOSFET technology minimizes the amount of heat generated when high currents are flowing through the switches. The MOSFET switches 20, 22, 24, 26 are arranged in an H-bridge configuration as illustrated in FIG. 2. With reference to FIG. 2, when diagonal switches 20, 26 are "ON", it will allow current to flow through the motor field coil 28 in a first direction A, and when the opposite two diagonal switches 22, 24 are "ON", it will allow current to flow through the motor field coil 28 in the opposite direction as illustrated by arrow B. The reversed flow through the motor field coil 28 reverses the direction of the motor and changes the winch from power in to power out, or vice versa. From the MOSFET module 18, current is provided to the motor armature 30, as best illustrated in FIG. 2. Each of the MOSFET switches 20–26 is controlled by a gate driver signal 32, 34, 36, 38, respectively, received from a microcontroller unit 40. Although the preferred embodiment discloses an H-bridge configuration, it should be understood that other switch configurations could be used without departing from the spirit and scope of the present invention.

Figure 6:
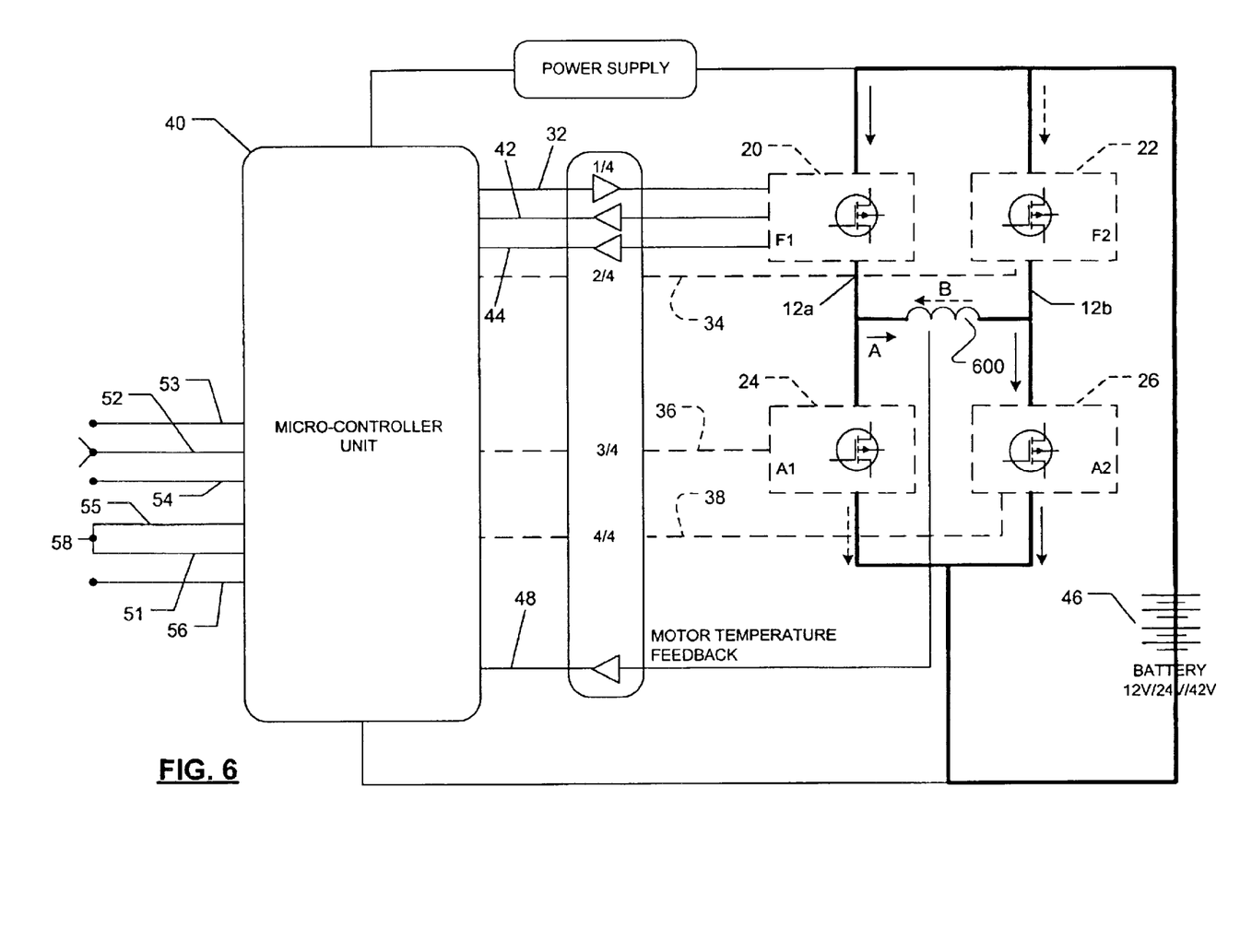
FIG. 6 is a schematic diagram of the winch controller according to the principles of the present invention for use with a DC permanent magnet motor.
Figure 7:
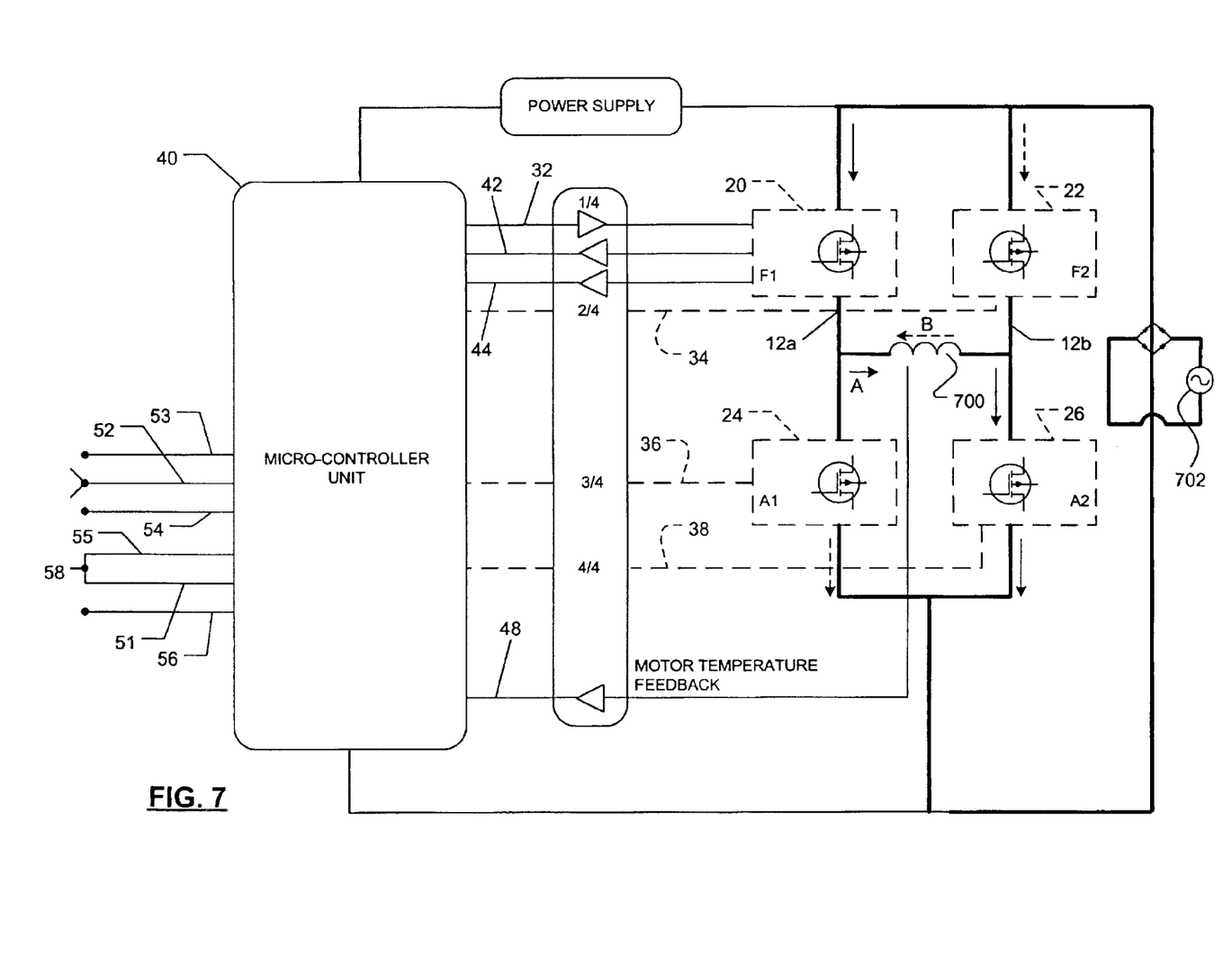
FIG. 7 is a schematic diagram of the winch controller according to the principles of the present invention for use with an AC power source and motor.

Each of the MOSFET switches 20, 22, 24, 26 are provided with a temperature sensor that each provides temperature feedback 42 to the controller unit 40. A current/voltage feedback 44 (only one of which is shown) is also provided to the controller unit 40. The power supply of the microcontroller unit 40 is connected to the battery 46. Although the power supply is disclosed as including a battery, it should be understood that other power sources, such as an AC power source, may also be utilized with the present invention. In particular, the system of the present invention can be applicable for use with an AC motor 700 and AC power source 702 as schematically illustrated in FIG. 7, wherein like or similar elements are designated with the same reference numerals as described with reference to FIG. 2. Additionally, the system of the present invention can also be applicable for use with a DC permanent magnet motor 600 as schematically illustrated in FIG. 6, wherein like or similar elements are designated with the same reference numerals as described with reference to FIG. 2. For these alternative applications (as shown In FIGS. 6 and 7), the armature 700 of the AC motor and the armature 600 of the DC motor is located in the bridge configuration since there is no field coil. The controller unit 40 may be provided with motor temperature feedback 48 which can be in the form of a temperature sensor which provides a temperature signal to the controller unit or a thermal protection device 49 which is switched from a closed condition to an opened condition once the motor reaches a predetermined temperature. When the thermo-protection device 49 switches from closed to opened in response to reaching a predetermined temperature, a motor temperature feedback signal may be provided to the microcontroller unit 40.

A hand controller 50 (best shown in FIG. 1) is provided for remote control of the winch system 10. The microcontroller unit 40 is provided with six lead terminals 51–56 including a ground connection 51, a power connection 52, a power "out" connection 53, a power "in" connection 54, an indicator/programmer detect connection 55, and a program voltage connection 56. The remote controller 50 includes an indicator light 58 for providing user feedback to the operator. The power "in" and power "out" inputs 54, 53 from the hand controller 50 closes one of the inputs to battery voltage to command the controller 40 to turn the winch motor on. When the operator closes the power "in" switch, the controller turns ON the MOSFET switches 20 and 26. When the operator closes the power "out" switch, the controller 40 turns ON the MOSFET switches 22 and 24. If somehow the power "in"0 and power "out" switches are both closed, the winch turns off.

The controller 40 enters a sleep mode after a period of inactivity. The sleep mode lowers the quiescent current draw on the battery 46. Any hand controller activity will cause the system to automatically exit the sleep mode.

The micro-controller 40 begins monitoring for various faults when either of the hand controller 50 inputs are engaged. After one of the hand controller 50 inputs is switched on, the micro-controller 40 checks whether the battery voltage is within limits; checks whether the modular temperatures are within limits; checks whether the armature voltage is near ground; checks whether the field voltages are equal and between limits; individually engages each switch and makes sure terminals show an appropriate voltage; and for commercial winches, checks to see if the motor thermal protection device 49 is closed. Once the winch motor 12 is engaged, the controller 40 continues to monitor the battery voltage, MOSFET module temperature, motor temperature switch input, and switch voltage drop.

For winch controllers designed for recreational use, if during operation the motor thermal protection device 49 opens, the indicator light 58 comes on. The indicator light 58 remains on until the winch is turned off or the thermal protection device 49 closes. The motor thermal protection device 49 does not prohibit winch motor operation for recreational winch controllers. For commercial winch controllers, if, during operation, the thermal protection device opens, the winch motor is stopped and the indicator light 58 indicates the motor over-temperature fault by providing a fault code, as will be described in greater detail herein. The winch motor 12 cannot be restarted until the thermal protection device 49 closes.

The indicator light 58 provided on the hand controller 50 indicates when there is some type of fault. If a major fault occurs, the winch motor 12 will be stopped and the indicator light 58 will begin to transmit a sequence of blinks. These blinks will indicate what type of fault has occurred. The indicator light 58 will blink a certain number of times to give a fault code. After blinking, the fault code, the indicator light will pause and then repeat the process. For example, two blinks can be utilized to represent motor over-temperature, three blinks for over-load interrupt, four blinks for module over-temperature, five blinks for battery voltage too low or too high, six blinks for wiring and/or power module switch fault, and seven blinks for module over current.

A module code is used to indicate the configuration of the controller. The currently programmed module code is indicated to the user whenever power is applied to the controller. The hand controller indicator light 58 will blink a number of times corresponding to the module code. The module code can be programmed at any time. The ability to individually program a controller for a specific module type facilitates rapid production line changes to the module. Several different module types can be defined, including, for example, module types for use with 12 volt, 24 volt, or 42 volt batteries, modules having motor over temperature conditions causing either a warning or for causing a fault, and modules including overload interrupt or no overload interrupt.

Figure 4:
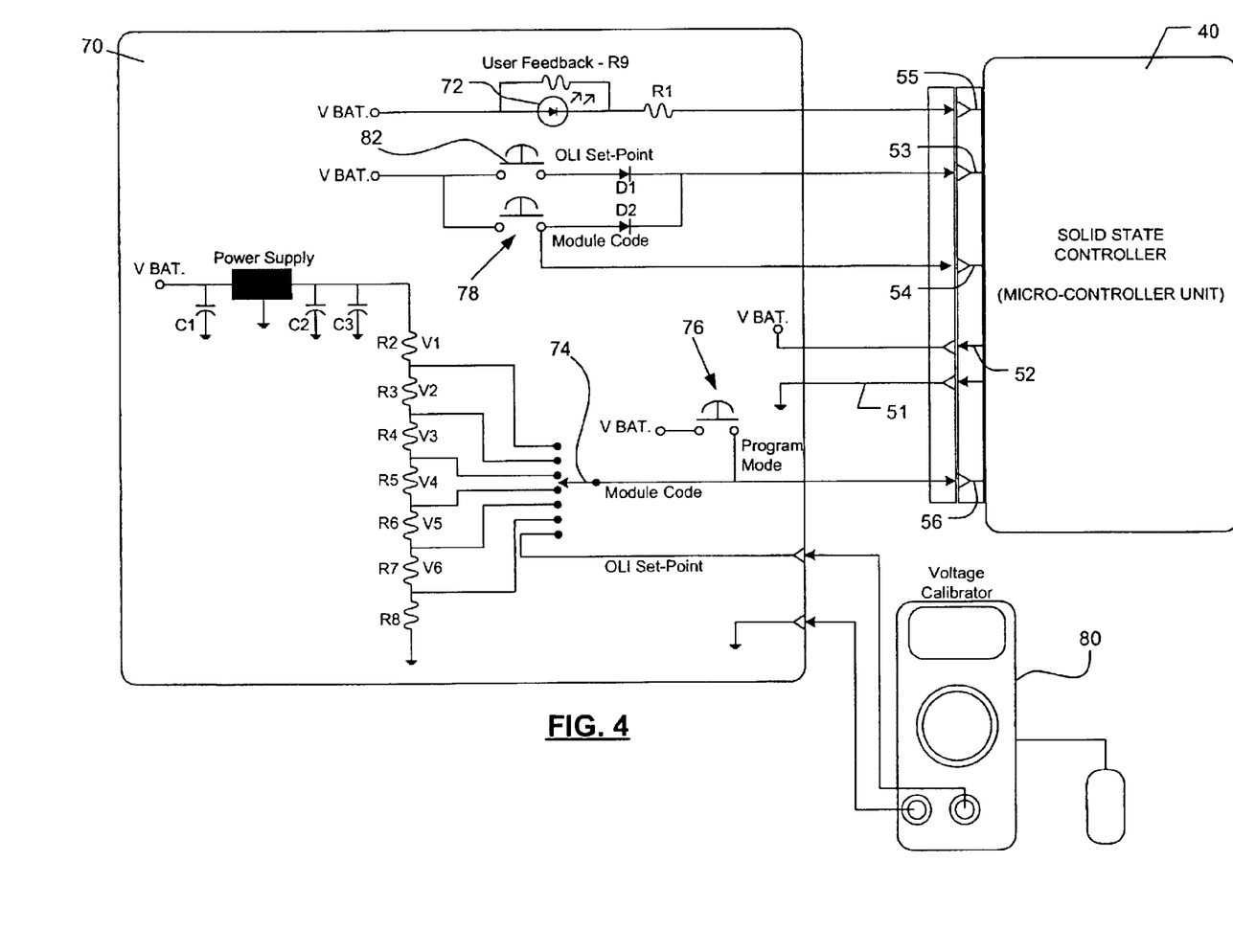
FIG. 4 is a schematic view of a programming harness and voltage calibrator according to the principles of the present invention used for programming the controller.

The module type is programmed by disconnecting the hand controller 50 and using a special programming adapter 70, as illustrated in FIG. 4. To program the module code, switches 82, 78, and 76 provide a sequence of coded operations while setting, a programming voltage on the program voltage input switch 74. A single one second blink of the indicator 72 shows the new module code is programmed. By way of an example, a first module code for use with a module type for a 12 volt battery with motor over-temperature causing a warning and no overload interrupt, has a programming voltage of, for example, within V1 voltage limits, while a second module code for a module type for use with a 12 volt battery having motor overtemp causing a fault and with overload interrupt enabled, is provided by a programming voltage within V2 voltage limits, while a third module code is provided for a module type for use with a 24 volt motor with motor overtemp causing a warning and no overload interrupt is provided by a programming voltage within V3 voltage limits, while a fourth module code is programmed for use with a module type for use with a 24 volt motor with motor overtemperature causing a fault and overload interrupt being enabled is set by a programming voltage, within V4 voltage limits, while a fifth module code is provided for a module type for use with a 42 volt motor with motor over-temperature causing a warning and no overload interrupt is provided by a programming voltage within V5 voltage limits, while a sixth module code is programmed for use with a module type for use with a 42 volt motor with motor overtemperature causing a fault and overload interrupt being enabled is set by a programming within V6 voltage limits. The resistors R2–R8 are connected in series to provide the variable programming voltage (V1 through V6), depending upon the setting of switch 74.

With a programmable module code system, a single controller can be utilized for a broad range of winch products having different configurations and features.

The overload interrupt function limits the maximum load capability of the winch. The overload interrupt function turns the winch off when the winch reaches a certain predetermined level. There is a correlation between the load level and the winch motor current. The MOSFET switches exhibit a voltage drop across the device that is proportional to the current through the device. Thus, it is possible to know the current through the MOSFET device and thus through the motor by monitoring the voltage across a MOSFET switch. The resistance of the MOSFET devices can vary with temperature and with part-to-part tolerances. To account for temperature effects, the power module has temperature sensors embedded in it that provide the temperature feedback 42 to the microcontroller 40. The sensors are read by the microcontroller 40. The microcontroller 40 then adjusts the MOSFET voltage drop reading by an amount dictated by the temperature sensor. Part-to-part tolerance is accounted for by calibration of the modules. The microcontroller 40 is loaded with a value that is used to adjust the voltage drop to take into account for part-to-part tolerance. Thus, the voltage drop is correlated to a known value of current.

The motor current may contain noise which is mostly due to the brushes of the motor. This noise in the current can be reflected in the voltage drop across the MOSFET. The MOSFET voltage drop signal is fed through both analog and digital low pass filters to remove the noise from the signal. Filters of this type are well known in the art.

The overload interrupt feature can be either enabled or disabled depending on the module code, as discussed above. The load on the winch is estimated from the voltage drop across one of the active switches 20, 22, 24, or 26. When the motor is under load, the active MOSFET switches 20–26 have a voltage drop that is proportional to the current in the switch. When the voltage drop exceeds the overload interrupt set point, the motor 12 is turned off and a fault is indicated (fault code #3 indicated by three blinks on the indicator 58). The overload interrupt set point can be programmed automatically or manually. The automatic setting is used to program the set point from the actual measured winch load while the winch is operating. The manual setting is used to program the set point using a manual set point adjustment.

Figure 5:
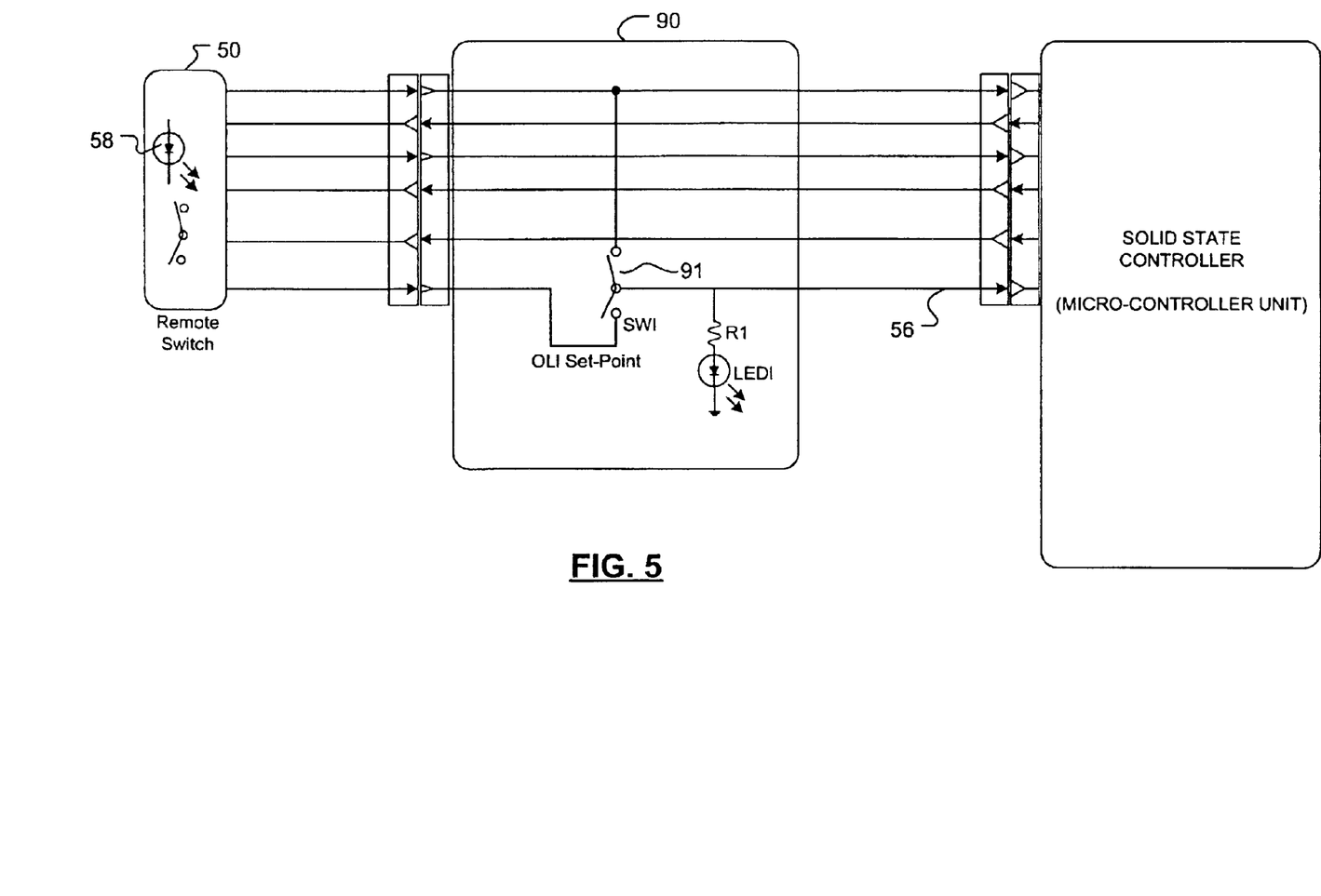
FIG. 5 is a schematic view of a programming adapter utilized with the remote controller for programming an overload interrupt set point according to the principles of the present invention.

Automatic programming for the overload interrupt is accomplished by use of a special programming adapter harness 90, shown in FIG. 5. The harness connects the program voltage input to battery voltage via a toggle switch 91. If the programming switch 91 is closed when the winch motor is commanded on in the power "in" direction, the controller 40 is put into automatic programming mode (i.e., programming mode is activated). The overload function is disabled when the controller is in the automatic programming mode. To program the set point, the winch must be externally loaded. The overload interrupt set point is determined when the winch motor is turned off. The load that existed on the winch at the instant the winch is turned off, is programmed as the new overload interrupt voltage set point. After programming the overload interrupt set point, the controller will blink the indicator 58 twice to indicate to the operator that the overload indicator set point has been set.

The following steps are used to program the overload interrupt set point automatically. First, the standard remote hand controller 50 is unplugged and the programmer harness 90 is plugged into the winch controller. The hand controller 50 is then plugged into the overload interrupt programmer harness 90, the programming switch 91 on the programming harness 90 is then switched to the program position which provides a signal via line 56 to the microcontroller that activates the programming mode. With the desired winch load attached, the winch has been turned on in the power "in" direction using the hand controller 50. When the desired load has been achieved, the hand controller switch 50 is turned off, thus turning off the winch motor 12. The overload interrupt set point voltage has been programmed by the controller with the last operating mode. The hand controller indicator 58 will blink twice confirming the programming. The programmer harness 90 is then removed and the hand controller 50 is reinserted so that the winch is now ready for normal operation.

Manual programming of the overload interrupt is accomplished by removing the hand controller 50 and using the special programming adapter 70. A voltage calibrator unit 80 is used to set the overload interrupt load point. The voltage calibrator 80 is set to a given voltage range. This voltage range corresponds to a given range current. This corresponding load level is determined from predetermined winch testing that determines the voltage corresponding to certain predetermined load limits.

The set point is programmed by removing the hand controller 50 and plugging in the special programming adapter 70. The voltage calibrator 80 is plugged into the special programming adapter, as illustrated in FIG. 4. The voltage calibrator 80 is then set to the desired load point (using the aforementioned given voltage range). The programming adapter 70 is provided with an overload interrupt program button 82 which is then pressed and released. The overload interrupt program button 82 connects power out to the battery voltage, and upon release of the switch, the indicator 72 will blink three times indicating that the overload interrupt set point has been programmed according to the voltage set on the voltage calibrator 80. The special programming adapter 70 is then replaced with the hand controller 50 which returns the winch to normal operation.

To make the overload interrupt set point correspond to a meaningful amount of current, each module is required to be calibrated. The calibration procedure establishes a known amount of current in the module and records the resulting switch voltage and switch temperature. The calibration procedure is activated by placing the module in programming mode and asserting the power in input.

With the solid state controller of the present invention, the winch system 10 is provided with fault detection for battery voltage, module temperature, motor temperature switch input and switch voltage drop. In addition, the winch is provided with overload interrupt via the controller as opposed to utilizing a separate module for the overload interrupt. This results in a decrease in cost and the number of components in the system. In addition, the ability to use a single controller across several product lines provides economies of scale for the manufacturer. The use of MOSFET switches for alternating the direction of current to the motor results in increased reliability for the winch. Furthermore, the electronics also allows the easy integration of the multiple novel features of the present system. The MOSFET technology minimizes the amount of heat generated when high currents flow through the switches and require low current input for changing the state of the switches.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A control system for controlling a motor of a winch, comprising:
   a power supply;
   a controller unit attached to said power supply;
   a user operable control device for providing input signals to said controller unit;
   a control circuit connected to said power supply and including four high current, non-mechanical electronic switches each of said electronic switches being operable between an open state and a closed state in response to respective control signals from said controller unit, a first two of said electronic switches being provided in parallel upstream of a motor field winding and a second two of said electronic switches being provided in parallel downstream of the motor field winding such that closing one of said first two of said electronic switches and one of said second two of said electronic switches causes current to flow through said motor field winding in a first direction while closing a second of said first two of said electronic switches and a second of said second two of said electronic switches causes current to flow through said motor field winding in a second direction opposite to said first direction, wherein said four high current non-mechanical electronic switches include MOSFET switches each controlled by low current control signals from said controller unit.

2. A fault detection system for a winch, comprising:
   a spool;
   a drive system drivingly connected to said spool and including a motor and a power source for providing current to said motor, said power source including a control circuit for controlling a direction of current supplied to a field coil of said motor;
   a controller for determining a fault condition based upon feedback signals from said control circuit; and
   a fault indicator responsive to said controller when said controller determines a fault condition, wherein said feedback signals are indicative of a thermal protection device condition.

3. A fault detection system for a winch, comprising:
   a spool;
   a drive system drivingly connected to said spool and including a motor and a power source for providing current to said motor, said power source including a control circuit for controlling a direction of current supplied to a field coil of said motor;
   a controller for determining a fault condition based upon feedback signals from said control circuit; and
   a fault indicator responsive to said controller when said controller determines a fault condition, wherein said feedback signals are indicative of a battery voltage.

4. A fault detection system for a winch, comprising:
   a spool;
   a drive system drivingly connected to said spool and including a motor and a power source for providing current to said motor, said power source including a control circuit for controlling a direction of current supplied to a field coil of said motor;
   a controller for determining a fault condition based upon feedback signals from said control circuit: and
   a fault indicator responsive to said controller when said controller determines a fault condition, wherein said feedback signals are indicative of a motor armature voltage.

5. A fault detection system for a winch, comprising:
   a spool;
   a drive system drivingly connected to said spool and including a motor and a power source for providing current to said motor, said power source including a control circuit for controlling a direction of current supplied to a field coil of said motor;
   a controller for determining a fault condition based upon feedback signals from said control circuit; and
   a fault indicator responsive to said controller when said controller determines a fault condition, wherein said feedback signals are indicative of a circuit module temperature.

6. A fault detection system for a winch, comprising:
   a spool;
   a drive system drivingly connected to said spool and including a motor and a power source for providing current to said motor, said power source including a control circuit for controlling a direction of current supplied to a field coil of said motor;
   a controller for determining a fault condition based upon feedback signals from said control circuit; and
   a fault indicator responsive to said controller when said controller determines a fault condition, wherein said feedback signals are indicative of a motor field voltage.

7. A fault detection system for a winch, comprising:
   a spool;
   a drive system drivingly connected to said spool and including a motor and a power source for providing current to said motor, said power source including a control circuit for controlling a direction of current supplied to a field coil of said motor;
   a controller for determining a fault condition based upon feedback signals from said control circuit; and
   a fault indicator responsive to said controller when said controller determines a fault condition, wherein said fault indicator provides a plurality of different indicator codes indicative of different fault conditions.

8. An overload detection system for a winch, comprising:
   a spool;
   a drive system drivingly connected to said spool and including a motor and a power source for providing current to said motor, said power source including a control circuit including a plurality of switches for controlling a direction of current supplied to a field coil of said motor;
   a controller for determining an overload condition based upon a voltage across one of said plurality of switches.

9. The overload detection system of claim 8, further comprising a temperature sensor for said one of said plurality of switches, said controller determining said overload condition based upon said voltage adjusted based upon a temperature of said one of said plurality of switches.

10. The overload detection system of claim 8, further comprising a low pass filter for removing noise from a voltage signal across said one of said plurality of switches.

11. A method of programming a controller capable of use for multiple types of winches, comprising the steps of:
   activating a program mode of a controller; and
   providing a programming voltage to said controller indicative of a type of winch the controller is installed in.

12. A method of programming an over-load interrupt function for a winch controller, comprising the steps of:
   activating a programming mode for the winch controller;
   attaching a load to the winch;
   turning the winch on until the winch achieves a desired load and turning the winch off when the desired load is achieved;
   sensing a voltage drop across a switch of said winch when said winch is turned off; and
   setting a voltage set point to said sensed voltage drop.

13. A method of programming an over-load interrupt function for a winch controller, comprising the steps of:
   activating a programming mode for the winch controller;
   providing a predetermined voltage to said controller indicative of a desired set point voltage corresponding to a desired over-load limit.

* * * * *